United States Patent [19]
Linhardt

[11] 3,966,362
[45] June 29, 1976

[54] PROCESS AIR COMPRESSION SYSTEM

[75] Inventor: Hans D. Linhardt, Costa Mesa, Calif.

[73] Assignee: Airco, Inc., Montvale, N.J.

[22] Filed: Aug. 24, 1973

[21] Appl. No.: 391,117

[52] U.S. Cl. .............................. 417/374; 417/244; 60/698
[51] Int. Cl.$^2$ ........................................ F04B 17/06
[58] Field of Search ........... 417/243, 244, 374, 406, 417/409; 62/402; 60/102, 698, 716, 718, 719, 39.18 A, 39.18 B, 39.18 C

[56] References Cited
UNITED STATES PATENTS

| | | | |
|---|---|---|---|
| 1,583,621 | 5/1926 | Steinberg | 60/102 |
| 2,173,595 | 9/1939 | Schutte | 417/374 |
| 2,328,451 | 8/1943 | Hedman | 417/374 |
| 2,793,019 | 5/1957 | Baumann | 60/39.18 C |
| 2,828,066 | 3/1958 | Wellauer | 417/374 |
| 2,828,066 | 3/1958 | Wellauer | 417/374 |
| 3,289,436 | 12/1966 | Groves et al. | 62/402 |
| 3,584,973 | 6/1971 | Lambiris | 417/409 |
| 3,609,967 | 10/1971 | Waldmann | 60/39.18 C |
| 3,703,807 | 11/1972 | Rice | 60/39.18 B |
| 3,731,495 | 5/1973 | Coveney | 60/39.18 B |

FOREIGN PATENTS OR APPLICATIONS 1,216,757  12/1970  United Kingdom ................. 417/374

Primary Examiner—C. J. Husar
Attorney, Agent, or Firm—Roger M. Rathbun; Edmund W. Bopp; H. Hume Mathews

[57] ABSTRACT

An air compression system for use in chemical processing operation. A primary air compression system module includes, on a common shaft, a multi-stage high pressure ratio compressor for supplying compressed air for the process, a pair of bearings support the common shaft and straddle the multi-stage compressor, a steam turbine is located on one end of the common shaft for providing start-up and supplemental power to the air compression module when necessary, and a radial inflow hot gas expander is provided on the opposite end of the common shaft which receives hot gas from the process for expansion thereof to provide the main power source for the air compression module. The air compression module is characterized by high power, relatively high speed operation suitable for applications in chemical processing industries and is a skid-mounted unit for ease of installation, and minimum overall reliability maintenance. It can be employed along with further process turbomachinery for the particular process concerned.

7 Claims, 4 Drawing Figures

PROCESS AIR COMPRESSION SYSTEM

BACKGROUND OF THE INVENTION

This invention relates generally to air compression systems, and more specifically relates to a modular air compression system adapted for use with certain industrial processes, such as petrochemical processes.

In various chemical process applications, a requirement exists for providing compressed air for use in the particular processes and where more than one expansion is utilized. A typical application of a use for the modular system of the present invention is in the process for production of nitric acid, wherein as a part of the process, one may require admixing gaseous ammonia with compressed air, the mixed gases then being fed to a suitable catalytic reactor surface. After additional treament, the resulting oxides of nitrogen may be further reacted with compressed air (in the presence of water) to provide nitric acid. The compressed air similarly, may be used for additional reactive steps, or for other purposes as are required in the overall process. It, of course, will be understood that these indicated steps, are merely intended to represent typical steps in a plant operation in which the present apparatus may be used, and are set forth herein merely to illustrate the environment in which the present apparatus has application.

The typical chemical process for which the present invention is directed is, however, generally characterized by the need for compressed air for use in the process, and has available a hot expandable gas, typically hot tail gas resulting as a product of combustion and is depleted in oxygen content.

In conventional turbomachinery for such chemical processes, high power equipment, generally in excess of 1000 horsepower is provided in the form of individual compressors and individual steam and hot gas expanders. Such individual machines were generally installed as low speed, multi-train systems by laborious aligning of each machine, requiring extremely time-consuming, and often unreliable results. In addition, the multi-train systems inherently included a plurality of bearings through the multi-train by coupling individual two-bearing machines, and often necessitated an additional gear box or gearing to insure the correct speed of each unit.

A single shaft machine has been disclosed in U.S. Pat. No. 3,696,637 for low power applications in the cryogenic or refrigeration fields, however, its design is not feasible when considered for large power chemical processing applications where only recently have advances in high pressure ratio multistage compressors having a pressure ratio in excess of 4 to 1 and high speed radial inflow expanders having pressure ratios in excess of 5 to 1 made such a common shaft high power air compression module possible for the chemical processing industry.

In accordance with the foregoing, the present air compression system module provides a compact high speed, high power turbomachinery utilizing only two bearings which is readily applicable to a wide variety of chemical process applications. Because the system employs a single, common shaft, the module has high reliability and requires a minimum of maintenance. The module is preferably skid-mounted so as to preclude any problems of on-site alignment or assembly.

The elements of this modular air compression system include on a common power shaft, a multi-stage high pressure ratio compressor and two turboexpanders, one of the expanders being powered by steam and the other expander being powered by hot tail gas from the process itself. The multi-stage compressor is preferably a two-stage compressor wherein at least one of the two stages operates at a pressure ratio in excess of 4 to 1.

Summary of Invention

Now, in accordance with the present invention, a modular air compression system is provided for high power applications wherein there is mounted on a common shaft, a multi-stage, high pressure ratio air compressor means for supplying air for use in the chemical processes with which the system is utilized, a radial inflow high pressure hot gas expander turbine means driven by hot tail gases from the said processes on the common shaft on one side of the compressor, and steam turbine means for providing starting and supplemental power on the common shaft at the opposite side of the compressor. Two main bearings flank the multi-stage compressor intermediate the expanders. A secondary turbomachine may be present for certain chemical processes, and includes on a second shaft, a low pressure gas expander connected to receive and be driven by the exhaust gases from the high pressure expander, and a gas boost compressor driven by the low pressure expander. The gas boost compressor receives gases from the chemical process, which gases are compressed and returned for further use in the processes. The various system elements, including controls and control panel, are completely integrated on a common skid to afford a highly reliable unit requiring only a minimum of connections at an installation, and also to accommodate factory testing as an integrated module.

BRIEF DESCRIPTION OF DRAWINGS

The invention is diagrammatically illustrated by way of example in the drawings appended hereto which.

DESCRIPTION OF THE PREFERRED EMBODIMENT

Figure 1:
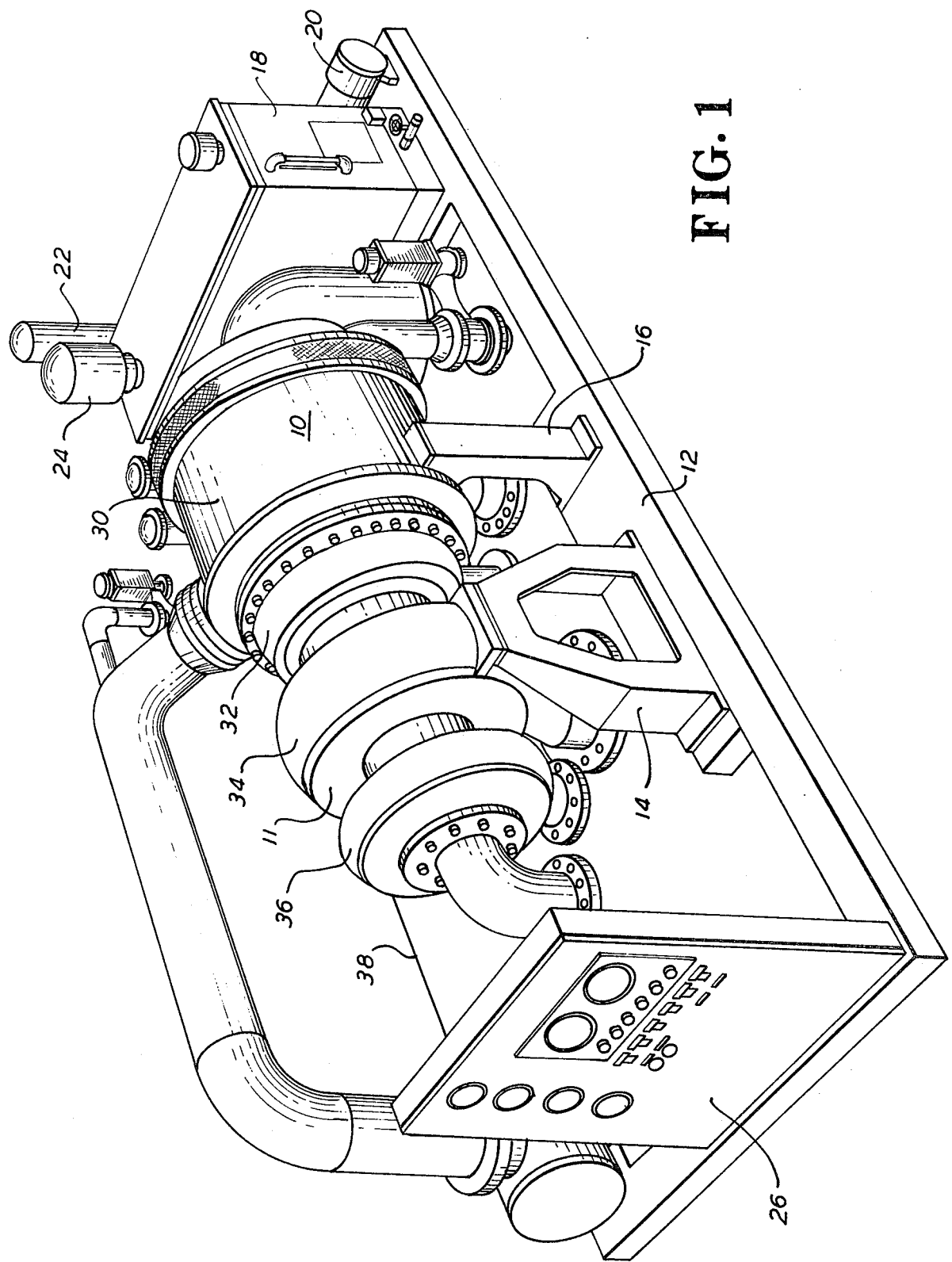
FIG. 1 is an external, perspective view of a modular air compression system in accordance with the present invention.

In FIG. 1 herein an external perspective view appears of a modular air compression system in accordance with the present invention. In the view depicted, the single shaft air compression module 10 is shown skid-mounted with a further secondary turbocompressor unit 11 for use in a chemcial processing system.

In particular, then, it is seen that a base in the form of a skid 12 is provided, upon which the air compression module 10 and secondary turbocompressor 11 are mounted. The air compression module 10 and the secondary turbocompressor 11 are thus seen to be supported from frame members 14 and 16, which in turn are secured at their bases to skid 12. Similarly it is seen that an oil reservoir 18, together with oil pumps 20, oil accumulator 22, and demister 24, are mounted at the far end of the skid 12, these several elements serving as part of the lubrication system for the overall loop system mounted on a common base. At the forward end of skid 12 a control panel 26 is mounted, which carries the various control gauges, actuating switches, etc., indicative of operation of the module. The varous guages and other controls, except for their arrangement in the present system (as will subsequently be described), are per se conventional.

The basic air compression module 10 forming part of the present invention includes a steam turbine 28 which may be a single or multi-stage unit, a two-stage air compressor 30 and a high pressure hot gas expander 32. The secondary turbocompressor unit 11 includes a low pressure expander 34 and a gas boost compressor 36. An intercooler is indicated generally at 38.

Figure 2:
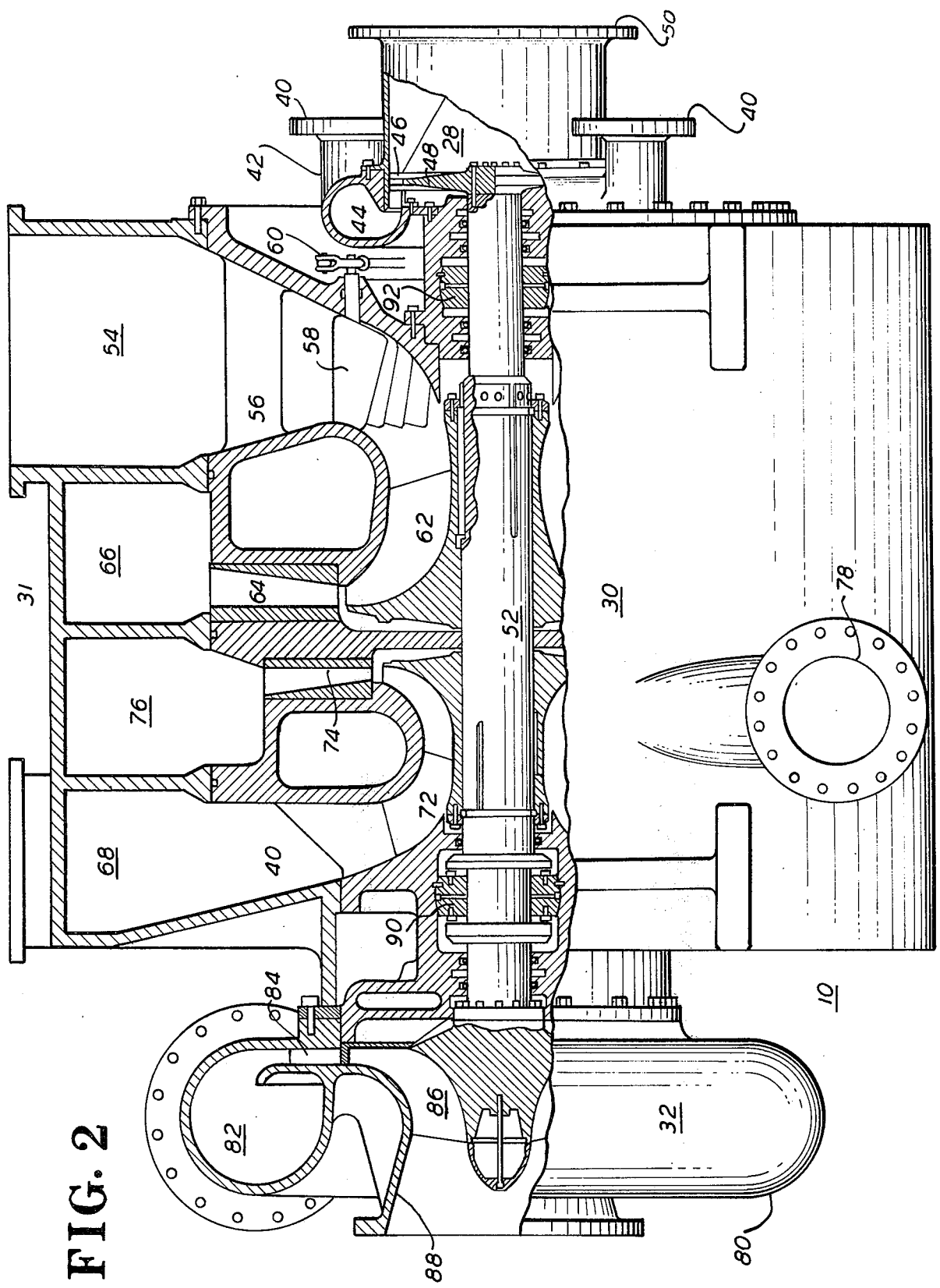
FIG. 2 is a side elevational view, partly in section, of the basic air compression module used in FIG. 1.

Turning now to FIG. 2, there is shown the air compression module 10 including the steam turbine 28, multi-stage compressor 30 and hot gas expander 32.

Taking first, the steam turbine 28, a steam inlet 40 is provided allowing the steam to enter the turbine casing 42 when it enters a scroll 44 and is expanded axially through impulse blades 46 on the turbine rotor 48 where the expanded steam is exhausted through the turbine outlet 50. The steam turbine itself is a high pressure ratio, high performance axial inflow unit of sufficient size to allow starting of the module 10 by steam power. As shown, it is a single stage machine however, as noted, it may be of the multi-stage design. After the air compression module 10 is in operation, the chemical process itself may generate sufficient hot tail gas to power the hot gas expander 32 to provide the total power for running the module 10, or in the alternate, the steam turbine 28 may continue to be operated in order to supply supplemental power to the system.

The turbine rotor 48 is affixed to the module common shaft 52 which, as shown, constitutes the main rotating shaft for the air compression module 10, including the multi-stage air compressor 30 and the hot gas expander 32.

The compressor 30, as shown, is a two-stage compressor having, in its first stage 31, an inlet 54 for receiving air at about ambient pressure to the compressor inlet passageway 56 where a variable vane 58 is positioned to vary the inflow of air. The variable vane 58 may be operated by conventional means such as control arm 60 from external the overall compressor casing. In generally conventional manner, the air is drawn in by rotating compressor vanes 62, compressed during discharge into the discharge passageway 64 and the compressed air is forced outwardly into annular discharge chamber 66 to the first stage outlet (not shown in FIG. 2). The compressor vanes 62 are, of corse, affixed to the common shaft 52. At least one of the stages of the two-stage compressor, preferably the first stage, operates at a pressure ratio in excess of 4 to 1.

In a similar manner, the second stage compressor 33 is provided by introducing the air at above ambient pressure into second stage inlet 68, inlet passageway 70 and through vanes 72 into discharge passageway 74 to annular discharge chamber 76 and out through the second stage outlet 78. As shown, the second stage does not provide variable vanes to effect control thereof. Again, the vanes 72 of the second stage compressor 33 are affixed to the common shaft 52.

A hot gas expander 32 is located on the remaining end of common shaft 52. The hot gas expander 32 comprises a casing 80 having an inlet, not shown in FIG. 2, for receiving the hot tail gas from the chemical process and introducing the hot gas to annular inlet chamber 82. From inlet chamber 82, the hot gas is expanded through a radial inlet passage 84 and rotating vanes 86; the expanded hot gas passing outwardly through expander outlet 88. This expander 32 is of the radial inflow design in order to expand very high pressure ratios, i.e. in excess of 5 to 1 necessary for the chemical processing industry applications. The high pressure ratios allow a design utilizing the minimum number of expander stages and is uniquely suited for high power requirements rather than an axial expander design. The power capacity may range in the order of from about 1500 horsepower up to 20,000 horsepower for a typical radial inflow hot gas expander.

In the overall arrangement of the air compression module 10, the common shaft 52 is supported through only two bearings 90 and 92 disposed on either side of the multi-stage compressor 30. The hot gas expander 32 and steam turbine 28 are overhung on the shaft 52 at opposite ends thereof. The overall module itself is a generally high speed, high power system and typical speeds range from 10,000 to 20,000 RPM with power in excess of 1500 horsepower.

As noted, the compression air module 10 is particularly well suited for application in the nitric acid process, generally in connection with additional secondary turbomachinery, all of which is preferably skid-mounted as shown in FIG. 1, specifically where the hot gas expansion is divided into a radial inflow high pressure stage and a separate low pressure stage expander for driving a further compressor such as a nitrous gas compressor as will be later explained.

Figure 3:
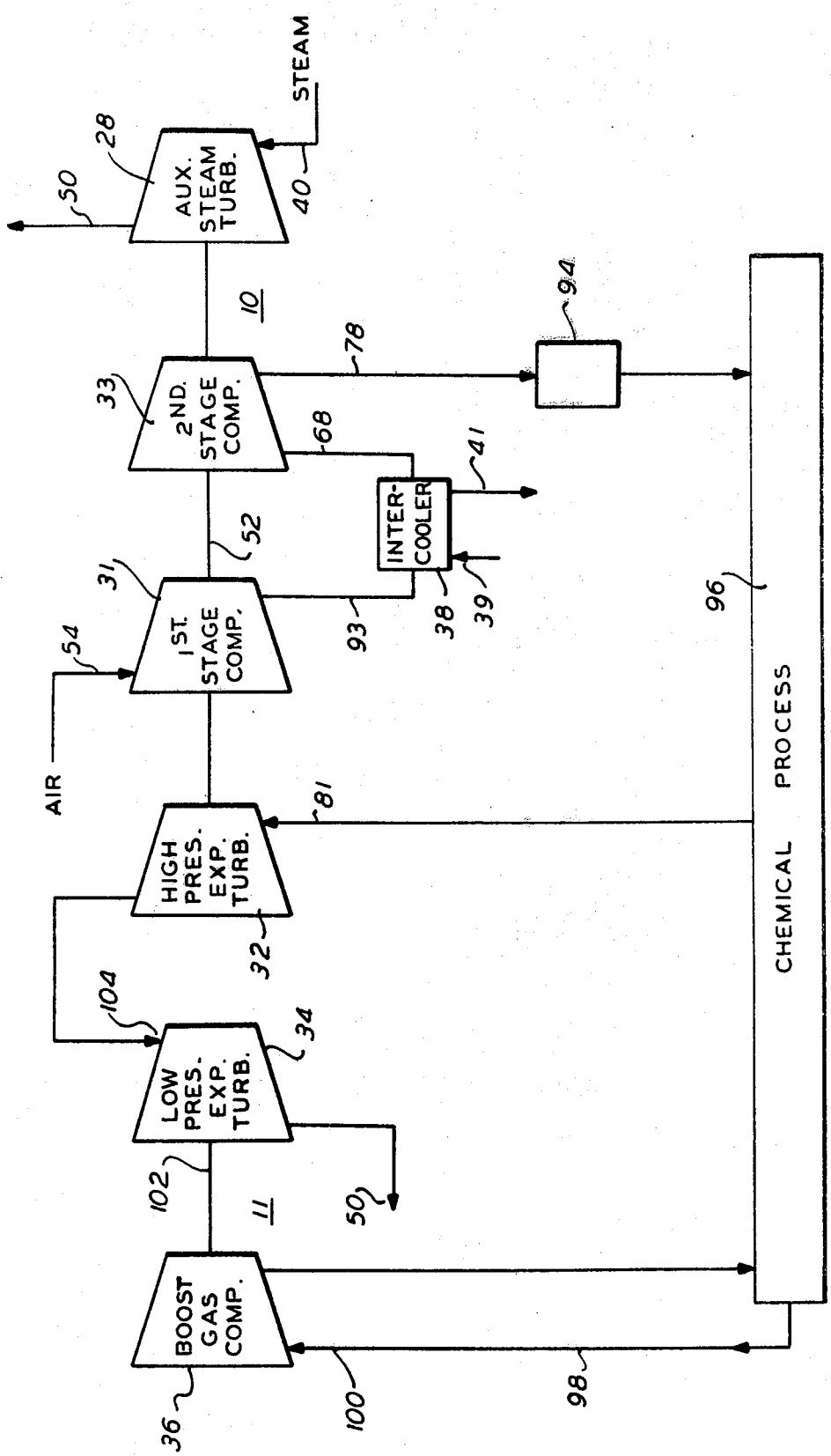
FIG. 3 is a simplified block diagram, setting forth in schematic fashion the manner in which the various components of the present invention function in the system.

Applying the foregoing described module to a process for production of nitric acid, there is shown in FIG. 3 a simplified block diagram setting forth in schematic fashion, the manner in which the various components of FIGS. 1 and 2 interact. The elements set forth in FIG. 3 are identified by reference numerals in correspondence to similar elements appearing in FIGS. 1 and 2. It is again emphasized here that application of this invention is not intended to be delimited to this specific process or environment, but the said apparatus may be utilized in other chemical process applications, including by way of example, SNG plant tail-gas compression systems, methanol plants or other large power applications requiring process compressed air and evolving, as a byproduct of the process, hot tail gases suitable for the recovery of power via expansion.

Specifically in FIG. 3, the air compression module 10 includes the steam turbine 28, first stage compressor 31, second stage compressor 33 (comprising the two stages of air compressor 30 in FIG. 1), and high pressure gas expander turbine 32, all coaxially mounted upon the single common power shaft 52. These several elements are, as noted, collectively defined as the air compression system module 10. Steam turbine 28 is preferably of the axial impulse design, and as will be discussed further hereinbelow, may be used both during starting of the module 10 and for auxiliary power during the further operation of module 10. Steam is supplied to turbine 28 via the inlet 40 and exits from the turbine via outlet 50. The two-stage centrifugal compressor 30 comprising first stage compressor 31 and second stage compressor 33, are directly driven by the single stage high pressure radial inflow expander turbine 32, as well as by steam turbine 28. The two compressor stages 31 and 33 are mounted back-toback, with the main bearings outboard of each stage, and an intercooler 38 is located between the stages. The low pressure first-stage 31 receives air through air inlet 54 at a specified temperature, and discharges the air to intercooler 38 at a much higher temperature. In a typical instance, for example, the air at inlet 54 may be at 86°F and at atmospheric pressure and the discharge air at the outlet 93 may be at temperature and pressure conditions of the order of 452°F and 63 psia. Intercooler 38 is of conventional tube and shell design wherein the gas flows in the tubes and the cooling water provided via inlet 39 flows through the main shell, and thence exits via outlet 41. After proceeding through intercooler 38, the air flow enters the second stage compressor 33 at inlet 68, typically at the order of 242°F and 60 psia.

The air flow from the second stage compressor 33 passes through outlet 78, typically being at pressures of the order of 125 psia and a temperature of 446°F. The compressed air thence may be provided to a reaction chamber 94 forming a part of the chemical process system with which module 10 is employed. In a typical instance the said compressed air is reacted with ammonia in chamber 94, the resulting effluent of gases thence being provided to subsequent downstream reaction points in the chemical process, which are schematically suggested by the block 96. The hot gas expander turbine 32 utilizes process tail gas introduced through inlet 81 which results from the chemical processes identified at block 96. In a typical application with which the present air compression module 10 is utilized, the said tail gas may have a pressure and temperature, respectively of the order of 180 psia, and of 1200°–1300°F. The tail gas may be expanded in two stages, with, as already indicated, only the first stage hot gas expander 32 forming part of the air compression module 10.

In the typical application, such as that cited herein with respct to a nitric acid plant, secondary turbocompressor 11 is used to process nitrous gases generated in the processes occurring in block 96, which gases require further compression for subsequent chemical reaction. These nitrous gases are accordingly provided via the line 98 and inlet 100 to th nitrous gas boost compressor 36. Typical inlet gas conditions are 110 psia at 140°F; and outlet conditions are 200 psia and 275°F. Compressor 36 is a conventional single stage radial flow device, which is operated by a shaft 102, completely independent of the shaft 52. The power for the said shaft 102, however, is provided by low pressure gas expander turbine 34, which as has been indicated, receives the gaseous output from high pressure expander turbine 32. The gas expander turbine 34, together with boost compressor 36, may be regarded as defining a secondary turbomachine 11, having a shaft 102 which is free with respect to shaft 52. In a typical instance the gas provided at inlet 104 of expander turbine 34 has a pressure of the order of 32 psia and a temperature of 667°F. The gas output from this low pressure expander 34 (at about 14.7 psia and 502°F) is then provided at outlet 106. Additional power for the boost compressor 36 may be provided by diverting a portion of the hot gas normally fed to hot gas expander 32 via line 105 directly to the inlet 104 of the expander turbine 34 with an appropriate control valve 107.

Lubrication systems and bearings utilized in the present air compression module are conventional, and are accordingly not shown in detail herein; the several elements of the lubrication system have been generally referred to heretofore with reference to FIG. 1 and include the oil reservoir 18, oil pumps, one of which appears at reference numeral 20, oil accumulator 22, demister 24 and further conventional elements such as oil filters and coolers.

Figure 4:
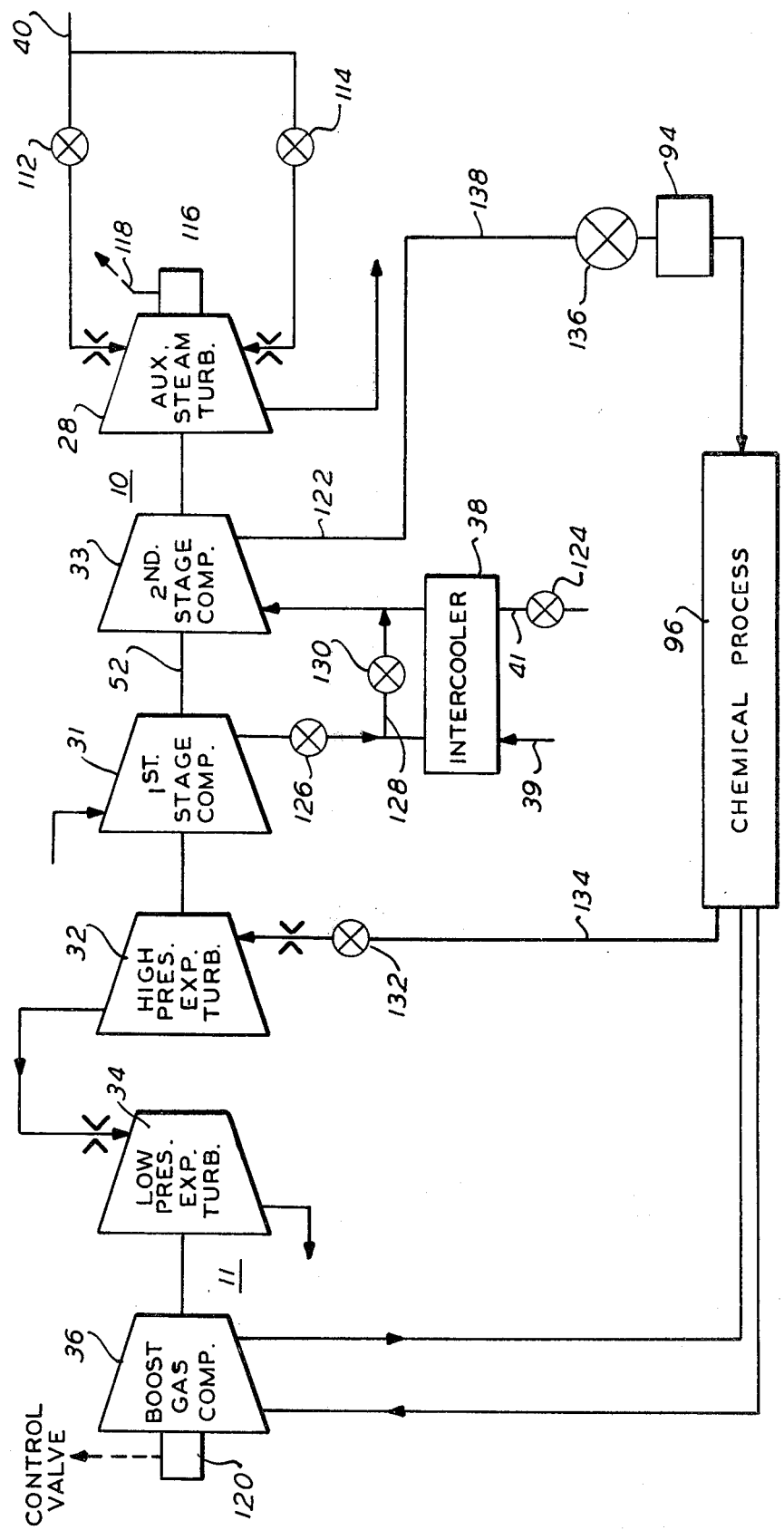
FIG. 4 is a schematic block diagram, generally similar to FIG. 3, but illustrating the control valve arrangements utilized in the said system.

FIG. 4 is a schematic block diagram, which is generally similar to FIG. 3 but illustrating the control valve arrangement utilized in accordance with the embodiment of the invention set forth. Referring to the controls for auxiliary steam turbine 28, it is seen that the steam inlet line 40, may proceed to steam turbine 28 either through main turbine valve 112 or through auxiliary start valve 114. The start and shutdown modes of the present air compression module 10 are controlled by these valves 112 and 114. In particular, during the start mode, steam turbine inlet valves 112 and 114 are opened, to provide sufficient power from turbine 28 to obtain adequate compressed air pressure for the process of block 96. Once, however, sufficient tail gas is developed from the said chemical process, the auxiliary start valve 114 may be closed, and the steam turbine need only be used, as necessary, to provide auxiliary power. A governor 116 is connected to a speed control valve through the schematically indicated connection 118, to regulate in conventional manner the speed of turbine 28. A similar governor 120 regulates the speed of boost compressor 36.

The air temperature of the compressed air proceeding via line 122, is controlled by varying the heat removal in intercooler 38. Specifically this is enabled by sensing compressor air temperature through sensing means (not shown), and utilizing the output from the sensor to position the water flow control valve 124 in the cooling water line. An interstage bleed valve 126 is also provided in the gas flow path proceeding between compressor stages 31 and 33, as is a bypass line 128 and valve 130 which can act to bypass a portion of the gases around the intercooler 38. A multi-stage compressor 30 of the present type demonstrates an instability at certain operating points which is created by mismatch between the front and rear stages at part speed. Whereas the stage inlet areas are near optimum at design speed, they are quite different at part speed. As compressor speed is reduced from the design value, the flow passed by the front stage tends to diminish linearly with speed, but the output density delivered to the second stage falls with speed squared. Since the second stage area is fixed, the air velocity must increase there — relative to the rotor speed. A choking condition can, therefore, be approached where the velocity cannot increase, so that the relative level of velocity is reduced at the compressor first stage inlet. This is to say that the front stage is tending toward stall, while the second stage is approaching a choked/flow condition. Since the condition is created by excess flow delivered to the second stage, it is effectively eliminated by controllably opening interstage bleed valve 126.

The speed of the turbocompressor stages 31 and 33 is controlled by throttling the inlet working fluids (steam and tail gas) to the high pressure expander 32 and to the steam turbine 28. This is effected by means of the valve 112 already discussed, and by valve 132 in line 134. Bypass valve 136 in line 138 proceeding from second stage compressor 33, serves to enable a surge control function. This is required for the system startup mode. In particular, any surge tendencies at the second stage compressor 33, results in the opening of bypass valve 136 which reduces the discharge pressure, and hence the stage tendency.

It should be appreciated that the secondary turbomachine 11 of FIG. 1 may not be required in all applications of the invention. This is to say that, depending upon the chemical processing system to which the invention is applied, a boost compressor 36 may or may not be required. Accordingly, it should be evident that an air compressor modular unit 10, such as that of FIG. 2, may be used alone, or in certan instances, may be used with additional skid-mounted turbocompressor units as shown in FIG. 1 within the province of the present invention.

While the present invention has been particularly set forth in terms of specific embodiments thereof, it will be understood in view of the instant disclosure that numerous variations upon the invention are now enabled to those skilled in the art, which variations yet reside within the scope of the present teaching. Accordingly, the invention is to be broadly construed and limited only by the scope and spirit of the claims now appended hereto.

I claim:

1. A pre-assembled air compressor module comprising in combination:
   a. a portable support frame;
   b. a common unitary main shaft, rotatably supported with respect to said frame by a pair of spaced bearings;
   c. a steam turbine on one end of said shaft and outboard of one of said pair of spaced bearings for driving said shaft;
   d. a radial inflow hot gas expander having a pressure ratio of at least 5:1 and being located on the other end of said shaft and outboard of the other of said pair of spaced bearings, adapted to expand hot expandable gas for driving said shaft;
   e. a multi-stage high pressure ratio compressor on said shaft intermediate said steam turbine and said hot gas expander and between said pair of spaced bearings adapted to be driven by said shaft at least one stage of said compressor having a pressure ratio in excess of about 4:1;
   f. said module thereby comprising an intergrated unit requiring no on-site alignment or assembly of elements (b) through (e); and
   g. said module having a compressor horsepower rating of at least 1500 HP.

2. An air compression system, comprising in combination:
   A. a pre-assembled air compressor module including:
      a. a portable support frame;
      b. a common unitary main shaft rotatably supported with respect to said frame by a pair of spaced bearings;
      c. an axial flow steam turbine on one end of said shaft and outboard of one of said pair of spaced bearings, for driving said shaft;
      d. a radial inflow first hot gas expander on the other end of said shaft, and outboard of the other of said pair of spaced bearings, and adapted to expand hot expandable gas for driving said shaft;
      e. a multi-stage high pressure ratio compressor on said shaft intermediate said steam turbine and said hot gas expander, and between said pair of spaced bearings, said compressor being adapted to be driven by said shaft;
      f. said module thereby comprising an integrated unit requiring no on-site alignment or assembly of elements (b) through (e); and
   B. a secondary turbomachine, including a second hot gas expander adapted to receive hot gas from said first hot gas expander for further expansion of said gas, and a compressor adapted to be directly driven by said second hot gas expander for compressing a further gas.

3. An air compression system as defined in claim 2 wherein said multi-stage compressor comprises a first and a second compression stage, and wherein at least one of said compression stages operates at a pressure ratio in excess of 4 to 1.

4. An air compression system as defined in claim 2 wherein said at least one of said compression stages is the first compression stage.

5. An air compression system as defined in claim 3, wherein said air compression module and said secondary turbomachine are each mounted on said support frame.

6. An air compression system as defined in claim 3 wherein said hot gas expander has a pressure ratio in excess of 5 to 1 and is at least 1500 horsepower.

7. An air compressor system as defined in claim 3 wherein said first rotatable shaft rotates in excess of 10,000 RPM.

* * * * *